United States Patent
Salter et al.

(10) Patent No.: US 12,482,314 B2
(45) Date of Patent: Nov. 25, 2025

(54) SECURITY CARD TRACKING AND ADVISORY SYSTEM FOR MOTOR VEHICLE

(71) Applicant: FORD GLOBAL TECHNOLOGIES, LLC, Deaborn, MI (US)

(72) Inventors: Stuart C. Salter, White Lake, MI (US); Jeffrey R. Seaman, Petersburg, MI (US); Eugene Karpinsky, Farmington Hills, MI (US); Brendan F. Diamond, Grosse Pointe, MI (US); Annette L. Huebner, Highland, MI (US); John R. Van Wiemeersch, Novi, MI (US); Adil Nizam Siddiqui, Farmington Hills, MI (US)

( * ) Notice: Subject to any disclaimer, the term of this patent is extended or adjusted under 35 U.S.C. 154(b) by 76 days.

(21) Appl. No.: 18/522,653

(22) Filed: Nov. 29, 2023

(65) Prior Publication Data
US 2025/0174061 A1    May 29, 2025

(51) Int. Cl.
*G07C 9/00* (2020.01)
*G06V 20/59* (2022.01)

(52) U.S. Cl.
CPC ......... *G07C 9/00309* (2013.01); *G06V 20/59* (2022.01)

(58) Field of Classification Search
CPC ....... H04W 4/02; H04W 4/021; H04W 4/025; H04W 4/14; H04W 4/80; H04W 84/12; H04W 4/48; H04W 4/027; H04W 4/16; H04W 12/06; H04W 4/00; H04W 4/023; H04W 4/026; H04W 4/40; H04W 4/50; H04W 48/04; H04W 8/22; H04W 12/08; H04L 12/2816; H04L 9/0825; H04L 63/0869; H04L 67/1097; G08B 13/00; G08B 13/19695; G08B 17/10;
(Continued)

(56) References Cited

U.S. PATENT DOCUMENTS 9,374,135 B2    6/2016    Fleming et al.
10,453,052 B2   10/2019   Wurmfeld et al.
(Continued)

OTHER PUBLICATIONS

NTAG213 Shield-Shaped Glow-In-the-Dark Tag available from Ubitap NFC Technologies, retrieved from https://components.ubitap.com/#!/NTAG213-Shield-Shaped-Glow-In-the-Dark-Tag/p/408000013/category=6077007, Nov. 29, 2023.

*Primary Examiner* — Dionne Pendleton
(74) *Attorney, Agent, or Firm* — Frank Lollo; Eversheds Sutherland (US) LLP (57) ABSTRACT

A security token for accessing an automotive vehicle, such as an NFC access card or NFC-capable mobile phone, is monitored to help prevent it being left in the vehicle when the user exits the vehicle. An NFC reader in the passenger compartment communicates with the token to authorize access to predetermined functions of the vehicle. An image sensor captures images within the passenger compartment using an image sensor after the security token is presented to the NFC reader. A location of the token is tracked in the captured images. One or more predetermined carrier locations are identified which are associated with the user and which can remain with the user when the user exits the vehicle (e.g., a pocket or purse). A message to the user is generated as a reminder when the security token has not been detected to have been returned to an identified predetermined carrier location.

20 Claims, 5 Drawing Sheets

(58) Field of Classification Search
CPC .... G08B 25/10; G08B 29/185; H04B 1/3888;
G06V 10/82; G06V 20/588; G06V 20/59;
G06V 20/597; G06V 40/172; G06V
40/28; G06V 20/54; G06V 40/107; G06V
20/58; G06V 40/10; G06V 40/70; G06V
40/1365; G06V 40/16; G06V 40/171;
G06V 40/174; G06V 40/50; F21V 11/10;
F21V 5/002; F21V 9/083; B60R 16/037;
B60R 25/2081; B60R 25/24; B60R
25/241; B60R 25/252; B60R 25/10; B60R
25/1012; B60R 1/22; B60R 13/10; B60R
13/105; B60R 2300/30; B60R 2300/302;
B60R 2300/307; B60R 2300/802; B60R
2325/103; B60R 25/008; B60R 25/045;
B60R 25/06; B60R 25/23; B60R 25/25;
B60R 25/257; A45C 11/00; A45C 11/002;
A45C 15/06; G07C 9/00309; G07C
9/00563; G07C 2009/0088; G07C
2209/63; G07C 9/00857; G07C 9/00182;
G07C 9/00571; G07C 9/27; G07C
2009/00769; G07C 9/00944; G07C
9/00904; G07C 9/38; G07C 2009/00412;
G07C 2009/00507; G07C 2009/00523;
G07C 2009/00785; G07C 2009/00793;
G07C 2009/00825; G07C 2009/00976;
G07C 9/00817; G07C 9/10; G07C 9/21;
G07C 9/25; G07C 9/28; G07C 9/30;
G07C 2009/00277; G07C 2009/00634;
G07C 2009/00865; G07C 2205/02; G07C
2209/62; G07C 5/008; G07C 5/085;
G07C 9/00174; G07C 9/0069; G07C
9/00896; G07C 9/00912; G07C 9/20;
G07C 9/37; B60W 2420/403; B60W
40/08; B60W 2420/22; B60W 2420/54;
B60W 2530/201; B60W 2540/043; B60W
2540/221; B60W 2540/223; B60W
2540/225; B60W 2540/229; B60W
50/0098; B60W 30/06; B60W 2556/45;
B60W 50/14; B60W 10/04; B60W 10/20;
B60W 2050/021; B60W 2400/00; B60W
2510/24; B60W 50/0205; B60W
2050/143; H04M 1/72463; H04M
1/72454; H04M 2207/18; H04M 2242/30;
H04M 1/04; H04M 1/6075; H04M
1/72406; H04M 1/724098; H04M
1/72412; H04M 1/72457; H04M
1/724634; H04M 1/72513; H04M
2203/1016; H04M 2242/14; H04M
2250/10; H04M 2250/52; H04M 3/2218;
H04M 3/2281; H04M 3/42; H04M
3/42357; H04M 3/53333; H04M 3/54;
H04M 7/006; G06Q 40/08; F24F 11/30;
F24F 11/56; F24F 11/62; F24F 11/74;
G06F 17/00; G06F 3/0346; G06F 21/35;
G06F 21/32; G06F 21/83; G06K 7/10297;
G06K 7/1417; G06K 7/1452; G06K
19/07309; G16H 40/63; H05B 47/105;
H05B 47/19; H04N 23/66; H04N 7/181;
H04N 7/185; H04N 23/56; H04N 7/183;
H04N 7/186; B62D 15/0285; B62D
15/025; G06T 7/70; G06T 2207/20084;
G06T 2207/30252; G08G 1/168; G08G
1/017; G08G 1/144; G08G 1/167; G08G
1/0112; G08G 1/0133; G08G 1/042;
G08G 1/205; B60Q 1/48; B60Q 1/486;
B60Q 1/503; B60Q 1/507; B60Q 1/509;
B60Q 1/544; B60Q 2400/50; G01C
21/1656; G07B 15/04; E05B 2047/0048;
E05B 47/00; E05B 17/2084; E05B
2045/069; E05B 2047/002; E05B
2047/0022; E05B 2047/0058; E05B
2047/0072; E05B 2047/0091; E05B
2047/0094; E05B 2047/0095; E05B
45/06; E05B 47/0001; E05B 47/0012;
E05B 47/026; E05B 47/0676; E05B
55/12; E05B 63/0056; F02N 11/0803;
Y10T 292/1021; Y10T 292/57; Y10T
292/91; Y10T 70/5155; Y10T 70/5416;
Y10T 70/5792; Y10T 70/5832; Y10T
70/625; Y10T 70/65; Y10T 70/7062;
Y10T 70/7068; Y10T 70/7107; Y10T
70/7113; Y10T 70/7136; Y10T 70/7441;
G01S 19/01; G01S 19/36; G01D 21/02;
E05C 1/004; G05D 1/0022; G05D 1/027
See application file for complete search history.

(56) References Cited

U.S. PATENT DOCUMENTS

| | | | |
|---|---|---|---|
| 11,027,699 | B2 | 6/2021 | Golgiri et al. |
| 11,034,330 | B2 | 6/2021 | DeLong et al. |
| 11,375,163 | B2 | 6/2022 | Terauchi et al. |
| 2016/0369976 | A1* | 12/2016 | Lee .................. A45C 11/00 |
| 2020/0186730 | A1* | 6/2020 | Sakurada ............ H04N 23/90 |
| 2023/0050828 | A1 | 2/2023 | Elangovan et al. |
| 2023/0334279 | A1 | 10/2023 | Schubert et al. |
| 2023/0347903 | A1* | 11/2023 | Katz ................. G06V 20/597 |
| 2023/0356729 | A1* | 11/2023 | Gu .................... G06V 20/59 |
| 2024/0116475 | A1* | 4/2024 | Ying .................. H04L 9/0825 |

* cited by examiner

SECURITY CARD TRACKING AND ADVISORY SYSTEM FOR MOTOR VEHICLE

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to motor vehicle security systems utilizing access cards, and, more specifically, to a system for tracking a physical location of an access card for preventing inadvertently leaving an access card when exiting a vehicle.

Mechanical keys traditionally used for unlocking access doors to motor vehicles and for unlocking a steering wheel and starting a propulsion unit (e.g., internal combustion engine or electric vehicle powertrain) have been gradually replaced by passive and active electronic devices. Active devices include key fobs and smartphones (e.g., Phone-as-a-Key) with self-contained power supplies. Passive devices include transponders such as near-field communication (NFC) access cards.

These electronic devices can wirelessly authenticate a user in order to gain access to the vehicle (e.g., door unlocking), activate the vehicle (e.g., ignition of a combustion engine or activating an electric vehicle powertrain), and perform other functions.

NFC devices are advantageous because their very short transmission range makes it difficult for third parties to intercept and copy security data. NFC hardware is included in many smartphones, so that an appropriate app installed on the smartphone can be configured to operate as a smart key for the user. In addition, dedicated NFC-based access cards which are small and thin (e.g., the size of a credit card) are becoming popular. An NFC access card can be configured to obtain its power from the vehicle during a reading operation, or can include a self-contained power source. Digital key protocols have been developed to maintain vehicle security while enabling sharing and management of vehicle access. For example, a Digital Key standard has been published by the Car Connectivity Consortium.

In some embodiments, an NFC-based security system includes a portable NFC access card carried by the user and a fixed NFC unit mounted to the vehicle (i.e., an NFC card reader). For example, an NFC reader for gaining access to the vehicle (e.g., for unlocking a door) may be mounted behind a B pillar applique (e.g., on the vertical pillar located between the windows of a front door and a rear door on one side of the vehicle). Once a user (e.g., driver) has gained access into the passenger cabin of a vehicle, the NFC access card may be used as a key for accessing secure functions such as starting the vehicle and for distinguishing one authorized user from another (e.g., for adopting customized settings such as seat position). Accordingly, another NFC reader may be provided within the passenger cabin on an instrument panel or a center console, for example.

One or more display panels are typically mounted on the instrument panel or dashboard of a vehicle as part of a human machine interface (HMI). A touchscreen display panel typically creates "soft" menu buttons for collecting user inputs. Display panels have also become available in which wireless antennas (including NFC antennas) have been integrated into the surface of the display. The antenna can remain hidden and has negligible influence on the display surface itself. Since the reading operation would only briefly obscure the display panel, the inclusion of an NFC antenna for an NFC reader in the display panel provides the functionality of an NFC key without having to monopolize space on any interior surfaces of the vehicle and allows one common location across a vehicle manufacturer's product lines.

In order to be used when starting a vehicle, the NFC access card must be handled by the user to place it close to the NFC reader (e.g., parallel to, and within about 4 centimeters of, the reader surface). Thus, the access card is normally removed from a user's pocket, purse, or wallet in order to present it to the NFC reader. If the access card is not immediately returned to the pocket, purse, or wallet, the potential arises for the access card being left in the vehicle when the user arrives at a destination and exits the vehicle. Leaving an access card in the vehicle raises security concerns. Additionally, if the vehicle does not have a door exterior keypad or if the driver or user does not know the keypad code, they may be locked out of the vehicle if they are exclusively relying on the NFC access key and it has been left inside the vehicle. Moreover, some countries have regulations about leaving access keys in an automobile, and insurance may not cover losses from a vehicle theft if access keys are left in vehicle. The same concern can arise when an NFC-enabled mobile phone is left inside. In particular, a mobile phone might not include the full capability of a Phone-as-a-Key but instead have just a simple NFC-based access and start function, which can make it more likely to also forget the NFC phone when exiting the vehicle. As used herein, references to a security token or an NFC access card are meant to include any NFC access device (NFC card, NFC bracelet, NFC phone, etc.).

SUMMARY OF THE INVENTION

In one aspect of the invention, an automotive vehicle with a passenger compartment comprises a near-field communication (NFC) reader defining a touchpoint in the passenger compartment configured to communicate with a token carried by a user of the vehicle to authorize access to predetermined functions of the automotive vehicle when the token is presented to the touchpoint. An image sensor is configured to capture images within the passenger compartment. A tracking controller coupled to the image sensor and the NFC reader is configured to track a location of the token in the captured images after being presented to the touchpoint. The tracking controller is configured to identify one or more predetermined carrier locations associated with the user which can remain with the user when the user exits the automotive vehicle. A user interface coupled to the tracking controller generates a message to the user as a reminder when the tracking controller determines that the token has not been detected to have been returned to an identified predetermined carrier location after the token is presented to the touchpoint.

DETAILED DESCRIPTION OF PREFERRED EMBODIMENTS

Monitoring for misplacement of an access token (e.g., NFC access card) can be initiated in response to a vehicle controller detecting that the token has been used to start the vehicle. At the time when the token is presented to an interior reader, it can be readily detected on images captured in the vehicle passenger cabin and then tracked as the user puts the token away. An NFC card can be readily visible in captured images since people typically hold it by an edge to get the NFC card substantially parallel to the reader surface. For tracking purposes, camera data can be analyzed using artificial intelligence (AI) and/or machine learning (ML) tools to follow the NFC card (while being held in the user's hand) to encourage the card to be put back in a purse or pocket and not deposited on a center console, cupholder, or storage receptacle where it might be left in the vehicle when the user later exits the vehicle.

In some embodiments, when the card is not immediately put back in a pocket or purse then an immediate reminder can be generated to notify the user (e.g., via messages such as an audio playback via internal or external speakers, text box on a touchscreen display panel, or similar messages sent to the user's smartphone). In some embodiments, when the user places the NFC card in an improper location (e.g., cupholder without an NFC reader) the generation of a reminder message can be deferred until an opening of the driver door. In some embodiments, the user can be given an option to dismiss a reminder message and activate an adjustment or reconfiguration of a vehicle security system to prevent unauthorized use of a security token which is left in the vehicle. For example, the access rights of the token can be revoked. The revocation can be temporary until the user restores the token using a security applet on a smartphone, for example. In some embodiments, there may be a fleet manager in control of security for a fleet of vehicles, and the fleet manager can be automatically notified when a security token is left in a vehicle. The fleet manager may determine whether or not access rights for the abandoned token are revoked.

Visibility of the security token (e.g., NFC card) can be further enhanced by applying a long persistence phosphor and illuminating a blue LED integrated with the reader to excite the phosphor when the token is presented to the NFC reader. The blue LED may be mounted on a surface of the NFC reader, for example. This will immediately cause the card to glow, making it easier for the camera to track even in the dark. Alternatively, tracking can be enhanced using a photo-reflective material distributed in a predetermined pattern on the token which is configured to reflect infrared light. By activating an infrared light source continuously during tracking, the location of the token can be more reliably determined.

Figure 1:
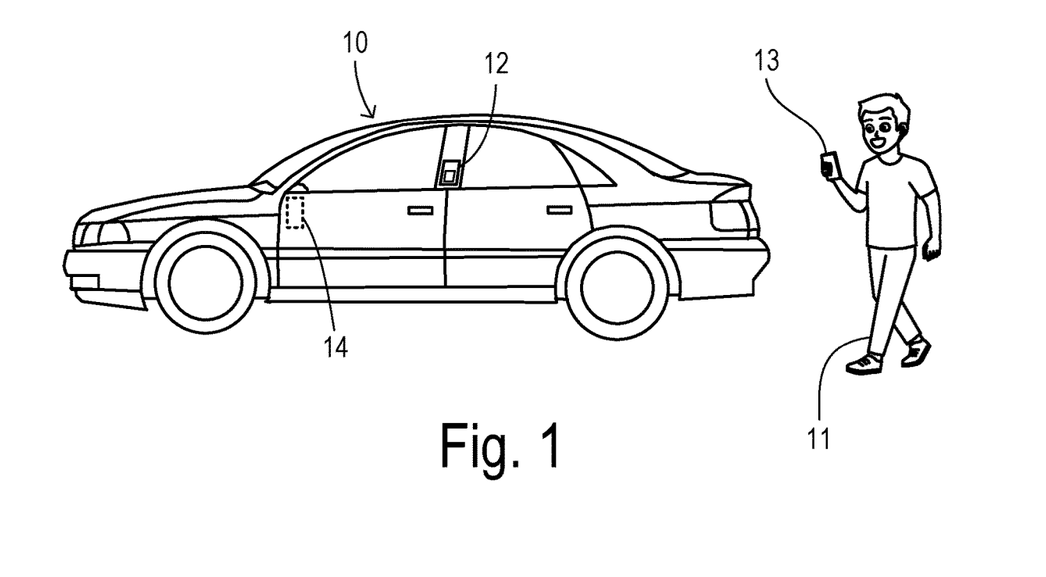
FIG. 1 is a schematic diagram of a user with an NFC access card which enables access and use of a vehicle based on NFC card readers on the vehicle.

Referring to FIG. 1, a vehicle 10 is accessible to a user 11 by interaction between a vehicle interface 12 and a mobile security token 13 (e.g., an NFC card or a wireless transponder or tag). Interface 12 may be an NFC reader including an NFC antenna to perform near field communication between a vehicle security controller (not shown) and security token 13 for unlocking vehicle 10. Once access to the interior passenger cabin of vehicle 10 is available, security token 13 may also be presented to an interior NFC reader 15 for accessing additional functions such as starting vehicle 10.

Figure 2:
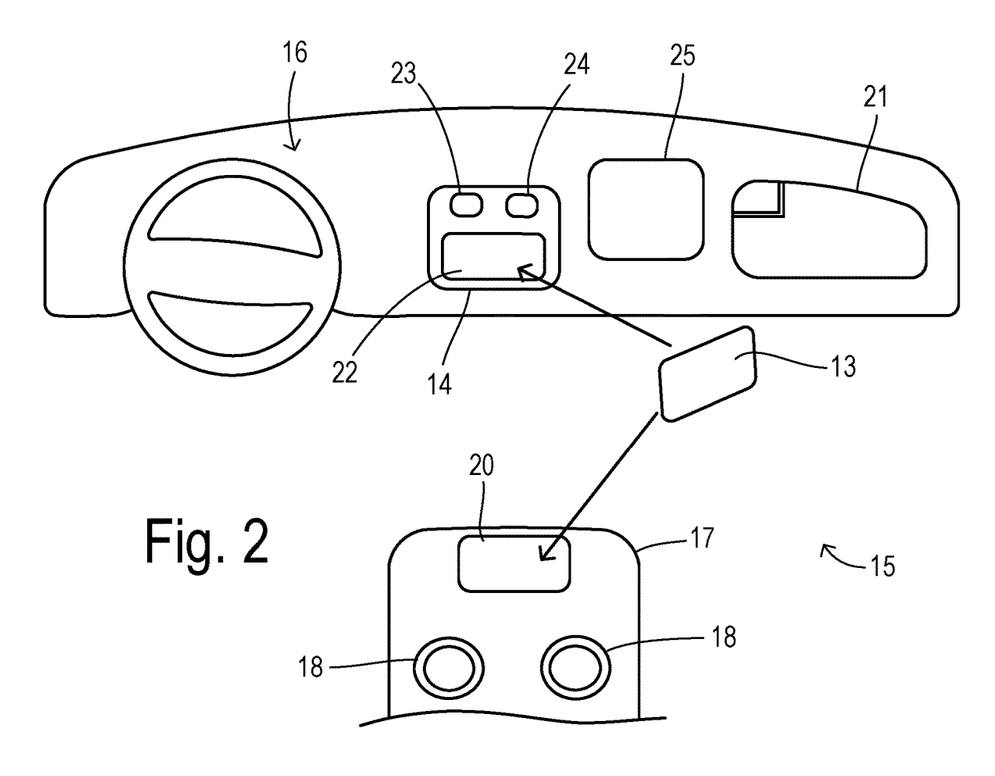
FIG. 2 is a schematic diagram showing a vehicle passenger cabin including NFC card readers.

In FIG. 2, a passenger compartment 15 of the vehicle is shown having an instrument panel 16 on which NFC reader 14 is mounted to enable easy access for placing a security token 13 in close proximity to NFC reader 14. Passenger compartment 15 also includes a center console 17 with cupholders 18. Console 17 may include a storage shelf 20, wherein shelf 20 and cupholders 18 represent examples of improper storage locations at which security token 13 might be placed after being presented to NFC reader 14. Instrument panel 16 may further include a storage bin 21 (i.e., glove compartment) representing another improper storage location where security token 13 could be placed and then inadvertently left in passenger compartment 15 when the user exits the vehicle. NFC reader 14 has a touchpoint 22 which is proximate to an NFC antenna for communicating with token 13. NFC reader 14 may further include an LED 23 for generating light according to a wavelength for exciting a photoluminescent material on security token 13 or an LED 24 configured to generate infrared light for interacting with a photo-reflective material on token 13 as described below. Instrument panel 16 may further include a human machine interface 25 which may include a display panel and audio transducers as known in the art.

Figure 3:
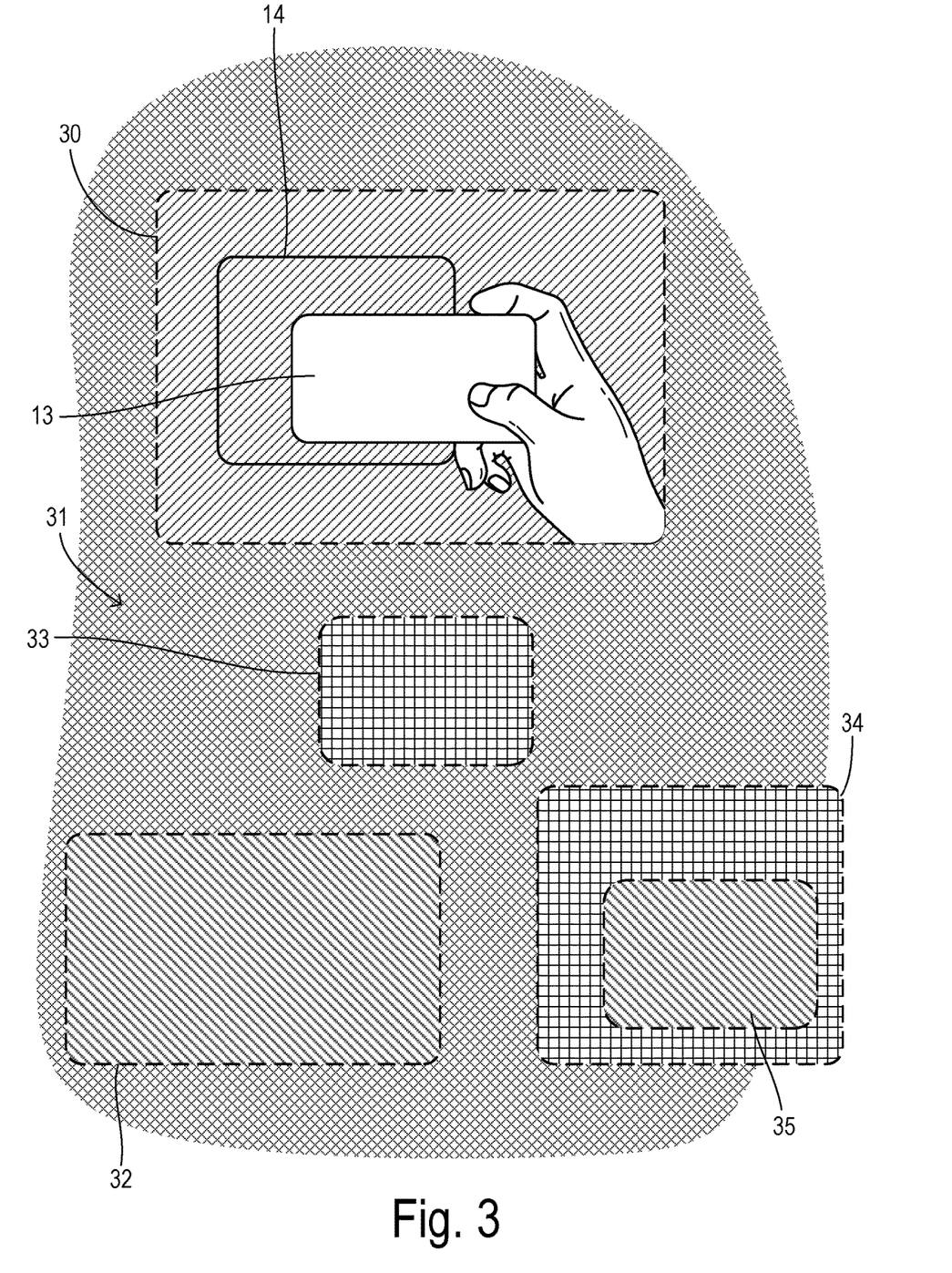
FIG. 3 is a schematic showing tracking regions within a passenger cabin for monitoring placement of an NFC access card after use for starting the vehicle.

In some embodiments of the invention, various regions within the passenger compartment may be defined according to whether particular locations represent a proper storage location or an improper storage location for the security token. As shown in FIG. 3, tracking of security token 13 begins when it resides in an origination region 30 which surrounds NFC reader 14. When the user withdraws token 13 from NFC reader 14 it enters an open region 31 which includes intermediate locations where the token cannot be stored (e.g., suspended in the passenger compartment without any supporting surface). One or more proper storage regions 32 may be defined according to static or dynamic elements in the passenger compartment which are associated with the user and which can be expected to exit the vehicle along with the user. Proper storage location 32 can include the pocket of a user's garment or a carried receptacle such as a purse, backpack, or briefcase. A region 33 represents an improper location such as a cupholder. In some instances, an improper storage region 34 such as the surface of the passenger seat may surround a proper storage location 35 which may be a purse placed on the seat, for example.

Figure 4:
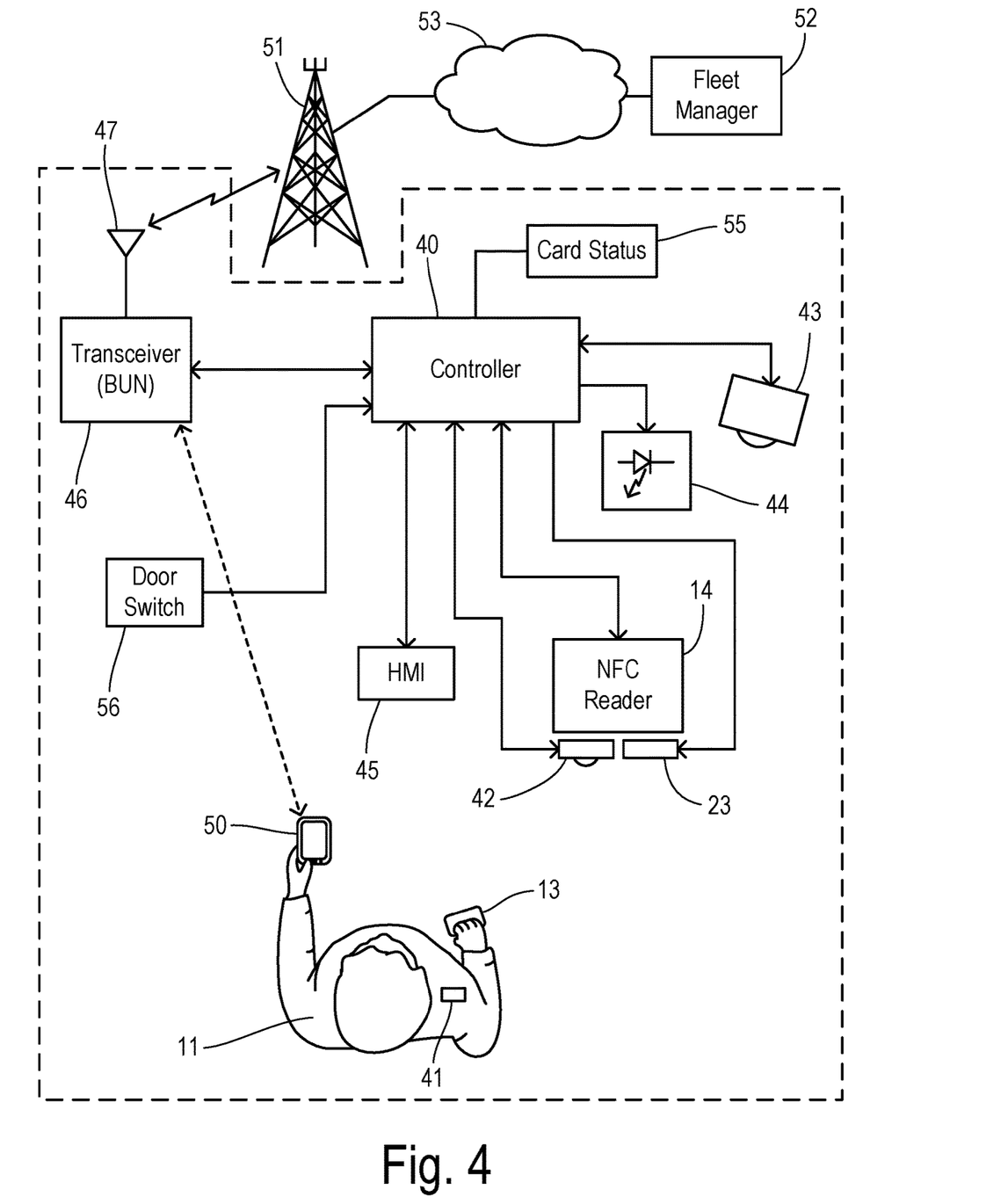
FIG. 4 is a block diagram showing one embodiment of a vehicle system for tracking proper storage of an NFC access card following its use.

FIG. 4 shows a vehicular system of the invention in greater detail. Vehicle 10 includes a main controller 40 which may be comprised of a programmable microprocessor configured in accordance with the present invention. Controller 40 is coupled to NFC reader 14 for communicating with security token 13 held by a user 11 while inside vehicle 10. User 11 has a pocket 41 in a worn garment, which represents one of a plurality of predetermined carrier locations into which the user would be expected to place security token 13 so that security token 13 would remain with the user when the user exits vehicle 10. The predetermined carrier locations can further include a carried storage device such as a purse, briefcase, backpack, or a pocket in a garment not presently worn but which arrived in the vehicle with the user and which would be expected to be removed upon exiting (e.g., a jacket). The classification and recognition of such predetermined carrier locations may be handled using artificial intelligence or machine learning tools. The selection and configuration of such tools is within the ordinary skill in the art.

Controller 40 is connected to LED 23 which is associated with NFC reader 14 and to an image sensor or camera 42 which may also be associated (e.g., integrated with) NFC reader 14. Camera 42 may be a dedicated camera for tracking security token 13, for example. Additionally, or alternatively, controller 40 may be coupled with a camera 43 mounted in the passenger compartment which may be present for performing other functions such as driver eye tracking, drowsiness detection, or occupant detection. When camera 43 operates for performing eye gaze detection, it may utilize infrared illumination provided by an infrared LED 44 which is also coupled to controller 40. Images captured by camera 43 can also be used for tracking security token 13 and for comparing locations of token 13 with potential carrier/storage locations provided by a user's garments or gear (proper locations which remain with the user when the user exits vehicle 10) and provided by vehicle surfaces (improper locations).

Controller 40 is coupled with a human machine interface 35 which may include a touchscreen display panel, speakers, and/or microphones for exchanging messages with user 11. Controller 40 is further coupled with a wireless transceiver 46 having an antenna 47 which is configured to interact with a smartphone 50 carried by user 11, thereby providing an alternate channel for generating messages to user 11 using the display screen or speakers of smart phone 50. As noted previously, in some embodiments, the smart phone 50 may also comprise security token 13 being used as the key for the vehicle. In those situations, an alternate channel for generating messages to user 11 may be utilized such as a vehicle internal or external speaker, internal or external display screen, and/or an alternate smart phone detected by wireless transceiver 46.

Preferably, transceiver 46 may be a BUN transceiver module capable of interaction via Bluetooth® communication, ultra wideband (UWB) communication, and NFC communication. Bluetooth® in particular may be used to link controller 40 to an applet in smartphone 50 when generating messages for user 11. Transceiver 40 may also include a cellular data link to a cellular system 51 to provide communication between controller 40 and a fleet manager 52 over a data network 53.

Controller 40 is coupled with a card status memory 55 which may store data corresponding to a set of uniquely-identifiable NFC cards and the status of corresponding access rights. A door switch 56 is coupled with controller 40 to provide a signal when user 11 opens a driver's door in preparation for exiting vehicle 10. A driver seat sensor (not shown) may also be used in some embodiments in order to detect whether the door may be open but the driver remains seated. Accordingly, the message could be delayed or suspended until the driver's intent to exit the vehicle is verified.

Figure 5:
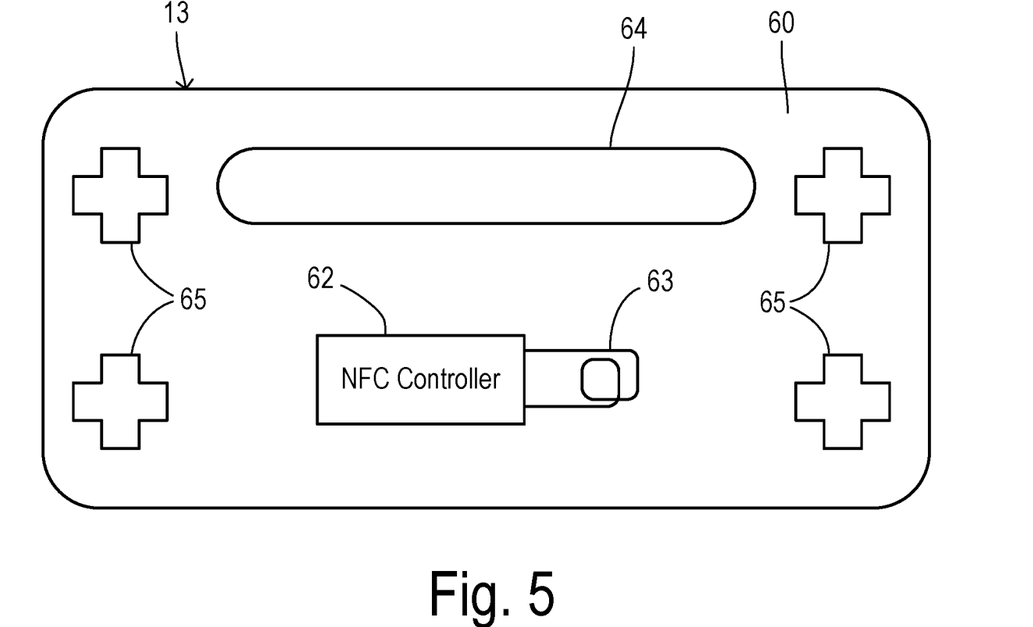
FIG. 5 is a front view of an NFC access card according to an embodiment of the invention.
Figure 6:
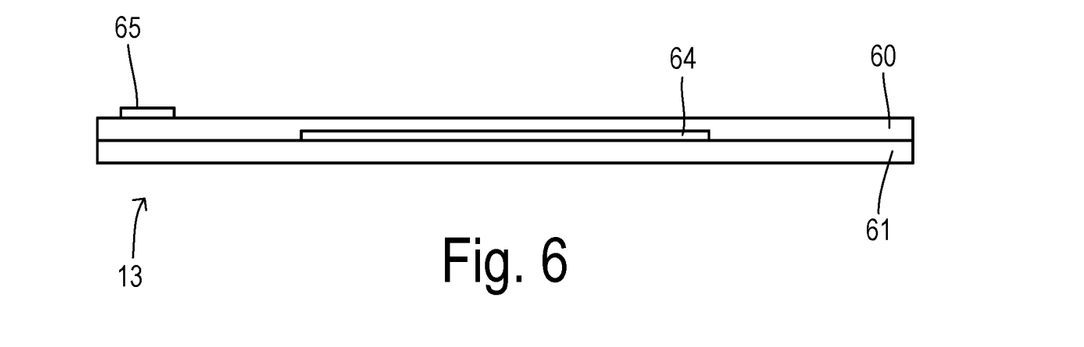
FIG. 6 is a side view of the access card of FIG. 5.

Alterations may be made to security token 13 to facilitate tracking based on camera images. As shown in FIGS. 5 and 6, token 13 may be comprised of an NFC access card having an upper substrate 60 and a lower substrate 61. Each may be formed of a thin plate of plastic. The plastic may be translucent at least in part. As known, an NFC controller 62 and an NFC antenna 63 may be sandwiched between substrates 60 and 61. A luminescent material 64 may be coated on or impregnated in one or both of substrates 60 and 61. A long-persistence phosphor formulation is preferably used (e.g., $CaAl_2O_4:Eu^{2+},Nd^{3+}$) so that a glow from the excited phosphor can assist in tracking NFC card 13 for at least several seconds or minutes. Translucent portions of substrates 60 and 61 may be arranged adjacent luminescent material 64 to facilitate excitation by an external light source (e.g., blue LED 23 in FIG. 4) and to enable subsequent light emission to be detected from either side of the NFC access card.

Either with or without luminescent material 64, token 13 can be provided with a photo-reflective material 65 distributed in a predetermined pattern and configured to reflect incident light. The incident light can be generated by an LED using a predetermined light spectrum, such as infrared light. In some embodiments, an infrared LED is utilized which is present in a vehicle within a gaze-tracking system intended to monitor a direction of the driver's gaze for purposes of providing driver assistance and driver assessment (since such systems are typically based on use of infrared light). Thus, the image sensor utilized for tracking of the security token can be comprised of an eye-tracking camera, and the stimulating light source can be an infrared-generating LED with is integrated with the eye-tracking camera. Alternatively, a separate dedicated infrared-generating LED source can be installed such that it is pointed at the NFC reader location(s).

In an embodiment in which an NFC phone is used as a security token, a photoluminescent or photo-reflective construction as discussed above can be similarly applied to the device. For example, a luminescent material or a photo-reflective material can be integrated into or coated upon a phone rear panel or a phone case. Alternatively, a stick-on sheet could be applied to the backside of the NFC phone.

Figure 7:
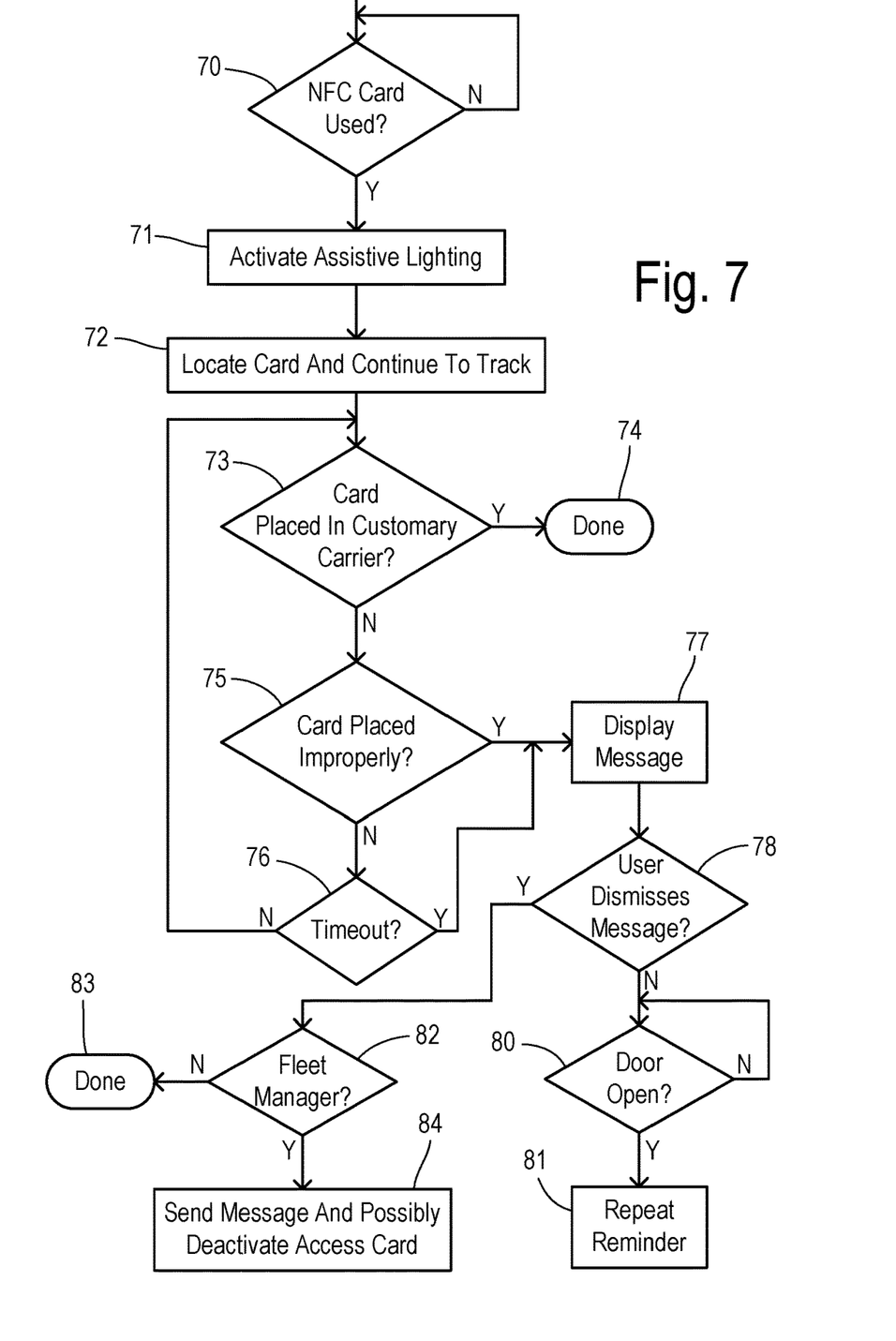
FIG. 7 is a flowchart showing one preferred method of the invention for tracking an NFC access card within a passenger cabin.

FIG. 7 shows a preferred method of the invention. A check is performed in step 70 to determine whether the NFC card has been used to access the vehicle functions (e.g., accessory mode or vehicle start-up) via an interior NFC reader. Upon detecting that the NFC card has been used in that way, assistive lighting is activated in step 71. The assistive lighting may comprise one or more pulses of an excitation light source such as a blue LED used when an NFC access card carries a photoluminescent material or/and continuous activation of an infrared light source when tracking of reflected infrared is to be employed. In step 72, the NFC card is located while still in close proximity to the touchpoint of the NFC reader, and then a stream of images captured by an image sensor are continuously monitored to track movement of the NFC access card.

In step 73, a check is performed to determine whether the card has been placed in a customary carrier (i.e., storage location) such as a predetermined pocket in a garment of the driver or other predetermined carrier locations such as a purse or backpack. If the NFC access card has been so placed, then the method completes at step 74. Otherwise, tracking of the location of the NFC access card continues and a check is performed in step 75 to determine whether the access card has been placed improperly. Improper locations may include a cupholder, console shelf, or other vehicle surface that do not have NFC readers which could enable the user to exit the vehicle without remembering to take the NFC access card with them. If step 75 determines the card is improperly placed, then a message is generated in step 77 as a reminder that the token has not been detected to have been returned to any of the proper carrier locations that may have been identified by the controller (e.g., a pocket or purse). Such a message may include a text display on a display panel, an audio message over a loudspeaker, or a transmission to a mobile wireless device or smartphone of the user.

If the card has not been detected to have been placed at an improper location in step 75, then a check is performed in step 76 to determine whether an excessive amount of time has passed while waiting from the NFC access card to be placed somewhere. A purpose of waiting for a predetermined amount of time is to avoid or recover from errors in tracking. If the predetermined time has not yet expired, then a return is made to step 73. Otherwise, the user interface may be activated in step 77 to generate a corresponding message to the user.

In some embodiments, a user may be given an option to dismiss a reminder message and to prevent the generation of further reminders. For example, a "Dismiss" button may be provided on a touchscreen display. A check is performed in step 78 to determine whether the user pressed the Dismiss button. If not, then further follow-up messages may be made (e.g., at the time of exiting the vehicle). Accordingly, a check is performed in step 80 to determine whether the driver door opens as indication that the user is preparing to exit. Once the door is detected as being open, then the reminder message may be repeated in step 81.

If the user does choose to dismiss the message in step 78, then a check may be performed in step 82 to determine whether there is a fleet manager which may have primary authority over the vehicle with authority to decide whether further action should be taken regarding an abandoned NFC access card. If there is no fleet manager, then the method may end at step 83. Otherwise, a message may be sent to the fleet manager in step 84 informing that the driver of the fleet vehicle is leaving an access card in an unattended vehicle. In response to a message sent in step 84, a fleet manager may determine that the access card should be deactivated and become inoperable for operating the vehicle until further corrective action is taken by the user or the fleet manager. The fleet manager may initiate a message to the controller to update a status of the NFC access card and make it inactive.

What is claimed is:

1. An automotive vehicle with a passenger compartment, the automotive vehicle comprising:
    a near-field communication (NFC) reader defining a touchpoint in the passenger compartment configured to communicate with a token carried by a user of the automotive vehicle to authorize access to predetermined functions of the automotive vehicle when the token is presented to the touchpoint;
    an image sensor configured to capture images within the passenger compartment;
    a tracking controller coupled to the image sensor and the NFC reader, wherein the tracking controller is configured to track a location of the token in the captured images after the token is presented to the touchpoint and beginning while the token is proximate the NFC reader, and configured to identify one or more predetermined carrier locations associated with the user which can remain with the user when the user exits the automotive vehicle; and
    a user interface coupled to the tracking controller and configured to generate a message to the user as a reminder when the tracking controller determines that the token has not been detected to have been returned to an identified predetermined carrier location after the token is presented to the touchpoint.

2. The automotive vehicle of claim 1 wherein the one or more predetermined carrier locations identified by the tracking controller are comprised of a pocket of a garment of the user and a carrying bag of the user.

3. The automotive vehicle of claim 1 wherein the token is comprised of a near-field communication (NFC) card.

4. The automotive vehicle of claim 1 wherein the token is comprised of a near-field communication (NFC) capable mobile phone.

5. The automotive vehicle of claim 4 wherein the mobile phone comprises a substrate or an add-on case or add-on label carrying a photoluminescent material or a photo-reflective material.

6. The automotive vehicle of claim 1 wherein the tracking controller is further configured to detect an action of the user indicating that the user is exiting the automotive vehicle and configured to instruct the user interface to generate the message when the user is exiting.

7. A method of monitoring a security token used in an automotive vehicle, wherein a vehicle near-field communication (NFC) reader defines a touchpoint in a passenger compartment configured to communicate with the security token carried by a user of the automotive vehicle to authorize access to predetermined functions of the automotive vehicle, the method comprising the steps of:
    capturing images within the passenger compartment using an image sensor;
    detecting presentation of the security token to the NFC reader;
    tracking a location of the token in the captured images after the token is presented to the touchpoint and beginning while the token is proximate the NFC reader;
    identifying one or more predetermined carrier locations associated with the user which can remain with the user when the user exits the automotive vehicle; and
    generating a message to the user as a reminder when the token has not been detected to have been returned to an identified predetermined carrier location after the token is presented to the touchpoint.

8. The method of claim 7 wherein the one or more predetermined carrier locations are comprised of a pocket of a garment of the user and a carrying bag of the user.

9. The method of claim 7 wherein the token is comprised of a near-field communication (NFC) card or an NFC-capable mobile phone.

10. The method of claim 9 wherein the NFC card or NFC-capable mobile phone comprises a substrate carrying a photoluminescent material, and wherein the method further comprises the step of:
    activating a light source to stimulate the photoluminescent material to enhance tracking of the location of the NFC card or NFC-capable mobile phone.

11. The method of claim 10 wherein the photoluminescent material is comprised of a phosphor, and wherein the light source is comprised of a blue-light LED proximate to the touchpoint which is activated when the NFC card or NFC-capable mobile phone is being presented to the touchpoint.

12. The method of claim 9 wherein the NFC card or NFC-capable mobile phone comprises a substrate carrying a photo-reflective material distributed in a predetermined pattern and configured to reflect infrared light, and wherein the method further comprises the step of:
    activating an infrared light source to enhance tracking of the location of the NFC card or NFC-capable mobile phone.

13. The method of claim 7 further comprising the step of:
identifying one or more improper storage locations of the automotive vehicle;
wherein the message is generated if the token is tracked to the one or more improper storage locations.

14. The method of claim 13 wherein the improper storage locations are comprised of a storage bin, a cupholder, and a console shelf.

15. An automotive vehicle with a passenger compartment, the automotive vehicle comprising:
a near-field communication (NFC) reader defining a touchpoint in the passenger compartment configured to communicate with a token carried by a user of the automotive vehicle to authorize access to predetermined functions of the automotive vehicle when the token is presented to the touchpoint;
an image sensor configured to capture images within the passenger compartment;
a tracking controller coupled to the image sensor and the NFC reader, wherein the tracking controller is configured to track a location of the token in the captured images after being presented to the touchpoint, and configured to identify one or more predetermined carrier locations associated with the user which can remain with the user when the user exits the automotive vehicle; and
a user interface coupled to the tracking controller and configured to generate a message to the user as a reminder when the tracking controller determines that the token has not been detected to have been returned to an identified predetermined carrier location after the token is presented to the touchpoint;
wherein the tracking controller is further configured to identify one or more improper storage locations of the automotive vehicle, and is configured to trigger the user interface to generate the message if the token is tracked to the one or more improper storage locations.

16. The automotive vehicle of claim 15 wherein the improper storage locations are comprised of a storage bin, a cupholder, and a console shelf.

17. An automotive vehicle with a passenger compartment, the automotive vehicle comprising:
a near-field communication (NFC) reader defining a touchpoint in the passenger compartment configured to communicate with a token carried by a user of the automotive vehicle to authorize access to predetermined functions of the automotive vehicle when the token is presented to the touchpoint, wherein the token is comprised of a near-field communication (NFC) card which comprises a substrate carrying a photoluminescent material;
an image sensor configured to capture images within the passenger compartment;
a tracking controller coupled to the image sensor and the NFC reader, wherein the tracking controller is configured to track a location of the token in the captured images after being presented to the touchpoint, and configured to identify one or more predetermined carrier locations associated with the user which can remain with the user when the user exits the automotive vehicle;
a stimulating light source which is activated by the tracking controller to enhance tracking of the location of the NFC card; and
a user interface coupled to the tracking controller and configured to generate a message to the user as a reminder when the tracking controller determines that the token has not been detected to have been returned to an identified predetermined carrier location after the token is presented to the touchpoint.

18. The automotive vehicle of claim 17 wherein the photoluminescent material is comprised of a phosphor, and wherein the stimulating light source is comprised of a blue-light LED proximate to the touchpoint which is activated when the NFC card is being presented to the touchpoint.

19. An automotive vehicle with a passenger compartment, the automotive vehicle comprising:
a near-field communication (NFC) reader defining a touchpoint in the passenger compartment configured to communicate with a token carried by a user of the automotive vehicle to authorize access to predetermined functions of the automotive vehicle when the token is presented to the touchpoint, wherein the token is comprised of a near-field communication (NFC) card which comprises a substrate carrying a photo-reflective material distributed in a predetermined pattern and configured to reflect infrared light;
an image sensor configured to capture images within the passenger compartment;
a tracking controller coupled to the image sensor and the NFC reader, wherein the tracking controller is configured to track a location of the token in the captured images after being presented to the touchpoint, and configured to identify one or more predetermined carrier locations associated with the user which can remain with the user when the user exits the automotive vehicle;
a stimulating light source which is activated by the tracking controller to enhance tracking of the location of the NFC card, wherein the stimulating light source is configured to emit infrared light; and
a user interface coupled to the tracking controller and configured to generate a message to the user as a reminder when the tracking controller determines that the token has not been detected to have been returned to an identified predetermined carrier location after the token is presented to the touchpoint.

20. The automotive vehicle of claim 19 wherein the image sensor is comprised of an eye-tracking camera, and wherein the stimulating light source is integrated with the eye-tracking camera.

* * * * *